US008529978B2

(12) United States Patent
Sasame et al.

(10) Patent No.: US 8,529,978 B2
(45) Date of Patent: Sep. 10, 2013

(54) TEA LEAVES FOR EXTRACTION OF A GREEN TEA BEVERAGE

(75) Inventors: Masami Sasame, Makinohara (JP); Hitoshi Kinugasa, Makinohara (JP); Kazunori Okanoya, Makinohara (JP); Fumio Ito, Makinohara (JP); Hitoshi Iryo, Makinohara (JP)

(73) Assignee: Ito En, Ltd., Tokyo (JP)

( * ) Notice: Subject to any disclaimer, the term of this patent is extended or adjusted under 35 U.S.C. 154(b) by 0 days.

(21) Appl. No.: 13/575,504

(22) PCT Filed: Dec. 22, 2010

(86) PCT No.: PCT/JP2010/073108
§ 371 (c)(1),
(2), (4) Date: Jul. 26, 2012

(87) PCT Pub. No.: WO2011/092979
PCT Pub. Date: Aug. 4, 2011

(65) Prior Publication Data
US 2012/0294984 A1    Nov. 22, 2012

(30) Foreign Application Priority Data
Jan. 29, 2010  (JP) ................. 2010-019775

(51) Int. Cl.
*A23F 3/16* (2006.01)
(52) U.S. Cl.
USPC .............. 426/597; 426/77; 241/28
(58) Field of Classification Search
USPC ................. 426/77, 597; 241/28
See application file for complete search history.

(56) References Cited

U.S. PATENT DOCUMENTS

| 2007/0104851 A1 | 5/2007 | Iwasaki et al. |
| 2008/0292772 A1 | 11/2008 | Iwasaki et al. |

FOREIGN PATENT DOCUMENTS

| CN | 1893829 A | 1/2007 |
| EP | 1 695 629 B1 | 8/2011 |
| JO | 2008-000044 | 1/2008 |
| JP | 59-109132 | 6/1984 |
| JP | 02-128649 | 5/1990 |
| JP | 05-000047 | 1/1993 |
| JP | 07-135902 | 5/1995 |
| JP | 2001-245591 | 9/2001 |
| JP | 2002-034457 | 2/2002 |
| JP | 2003-310161 | 11/2003 |
| JP | 2004-208605 | 7/2004 |
| JP | 2005-058209 | 3/2005 |

(Continued)

OTHER PUBLICATIONS

Yamamoto. Green Tea. 1997. p. 14.*

(Continued)

*Primary Examiner* — Anthony Weier
(74) *Attorney, Agent, or Firm* — Foley & Lardner LLP

(57) ABSTRACT

Provided is a tea leaves for extraction of a low-caffeine green tea beverage, which is not susceptible to folding or browning during storage, and which enables the extraction of a green tea beverage which can be enjoyed hot or cold. Specifically provided is a tea leaves for extraction of a green tea beverage having a caffeine content with respect to the total mass of the dried leaves that falls within the range of 0.2 to 2.5 mass %, and the relation between the ratio of the mass content of theanine to the entire mass of dried leaves X (%) and the mass ratio of the content of monosaccharides to the fiber content Y satisfies the following condition: $-0.007X+0.024 \leq Y \leq -0.011X+0.039$.

7 Claims, 4 Drawing Sheets

(56) References Cited

FOREIGN PATENT DOCUMENTS

| | | |
|---|---|---|
| JP | 2005-058210 | 3/2005 |
| JP | 2008-113569 | 5/2008 |
| JP | 2009-100648 | 5/2009 |
| JP | 2009-291160 | 12/2009 |
| KR | 10-2006-0131786 | 12/2006 |
| WO | WO 2005/060761 A1 | 7/2005 |

OTHER PUBLICATIONS

VitaSouth Website. Facts on L-Theanine. No date provided. http://www.vitasouth.com/pages/Facts-on-L-Theanine.html.*
Chichester. Advances in Food Research. vol. 17. 1969. pp. 231-233.*
International Search Report PCT/JP2010/073108 dated Feb. 22, 2011.
"Shinchagyo Zensho", Chamber of Tea Association of Shizuoka Pref., pp. 275-276, 1988, edited by Chamber of Tea Association of Shuzuoka Pref.
Tomoyasa Anan et al., "Changes in the Free Sugar Contents of Green Tea during Heating or Storage", Changyo Gijitsu Kenkyu, 1984, No. 66, pp. 47-51.
Edited by Keiichiro Muramatsu, Cha no Kagaku, $1^{st}$ edition, $8^{th}$ print, Asakura Shoten, 1997, pp. 85-86, pp. 106-109.
Ministry of Education, Culture, Sports, Science and Technolgy, Kagaku Gijyutsu Gakajutsu Shingikai Shigen Chosa Bunkakai, Chapter 2, Fifth Reviosn and Enlarged Edition (Honhyo), Composition in Japan Fifth Revised and Enlarged Edition, 2005, <http://www.mext.go.jp/b_menu/shingi/gijyutu/gijyutu3/toushin/05031802/002/061.pdf>.
Tojiro Tsushida et al., "Selective Extraction of Caffeine with Hot Water from Intact Tea Leaves", Nippon Nogeikagaku Kaishi, vol. 59, No. 9, pp. 917-919, 1985.

* cited by examiner

[Fig. 5]
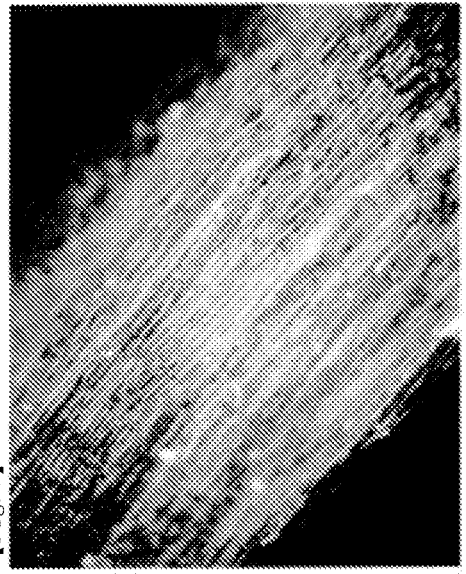
[Fig. 7]
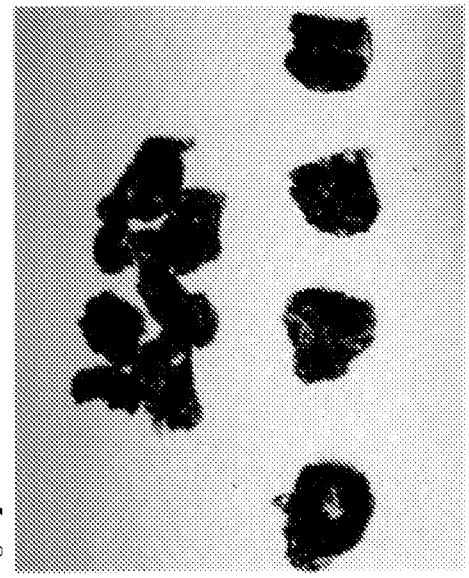
[Fig. 4]
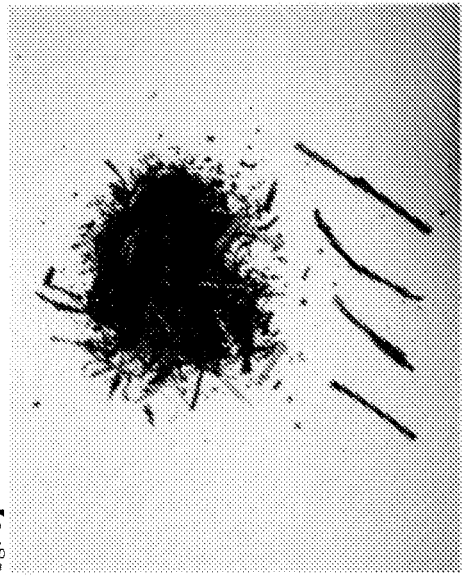
[Fig. 6]

TEA LEAVES FOR EXTRACTION OF A GREEN TEA BEVERAGE

TECHNICAL FIELD

The present invention relates to tea leaves for extraction of a green tea beverage which can be suitably used as raw tea leaves of a green tea beverage packed in a container which are filled into a container such as a can or a PET bottle, or tea leaves that are filled into a tea bag and the like, and further has reduced caffeine.

BACKGROUND ART

A tea has been familiar to people in the world through the ages, and the kind thereof is various such as unfermented teas represented by a green tea, semi-fermented teas represented by an oolong tea, and fermented teas represented by a black tea, and a drinking method thereof is also various.

Most of Japanese green teas including those on sale in a form of tea leaves and a beverage are produced through a series of processes of subjecting plucked tea live leaves to steaming with vapor, inactivation (oxidase deactivation) of oxidation enzymes contained in the tea live leaves, and then rolling by rough rolling, rolling, secondary drying and refined rolling and the like, and drying (see Non-Patent Document 1).

By subjecting live tea leaves to oxidase deactivation with a steaming method of steaming the tea leaves with vapor as described above, total tea leaves become soft by steaming heat, and thus it is possible to enhance dissolution of components in the tea leaves, and brew a rich tea.

For Chinese tea or Japanese oven-roasted tea (a bead green tea made by kamairi) and the like, an inactivation (oxidase deactivation) method for oxidation enzymes by roasting tea leaves with a heated oven is adopted instead of steaming heat (see Non-Patent Document 1).

If tea leaves are subjected to oxidase deactivation by direct flame heating, unique flavor of oven roasting can be boosted, and at the same time, refreshing tea taste can be completed, and thus tea beverages using raw tea leaves produced by oven roasting are on sale recently.

On the other hand, a green tea beverage has problems such as weakness to oxidation deterioration, generation of deteriorated odor, and in addition, precipitate called primary sediments generated immediately after production (also called cream down). In case of a green tea, the green tea has problems such as generation of precipitate called secondary sediments during storage. Therefore, from the past, various approaches for processed tea leaves used as raw materials of a green tea beverage have been conducted for the purpose of suppressing oxidation deterioration, suppressing generation of unpleasant odor, and furthermore, suppressing generation of primary sediments or secondary sediments.

For example, there has been disclosed a method of producing raw tea by oven roasting treatment with direct flame, whereby to be less likely to have generation of fine powders and suppress generation of deteriorated odor (Patent Document 1). In addition, there has been disclosed a method of controlling and suppressing generation of secondary sediments using theogallin or strictinin in tea leaves as a marker (Patent Documents 2 and 3).

In addition, there has been disclosed a method of producing raw tea for a beverage, in which tea leaves are set in a vacuum tank under reduced pressure and heated by microwave or far-infrared ray, and dried for a short time, whereby to suppress oxidation of the raw tea (Patent Document 4).

Furthermore, it has been disclosed a method of producing a beverage having stable color tone for a long time and having high concentration catechin by adjusting the contents of glucose and fructose in a green tea beverage to a certain amount, suppressing concentration of oxalic acid, and adjusting the ratio of caffeine to non-polymer catechins (Patent Document 5).

Caffeine contained in tea leaves has various effective pharmacological effects. However, for reasons such as sensitivity to excitatory action of caffeine, a caffeine-reduced beverage drew attention recently, and caffeine-reduced tea leaves used in a green tea beverage also drew attention.

As a means to reduce caffeine contained in tea leaves, for example, a method of removing caffeine from tea leaves by decocting or blowing warm water shower at the time of oxidase deactivation, and the like are disclosed (Patent Documents 6 and 7).

CITATION LIST

Non-Patent Document

Non-Patent Document 1: "Shinchagyo Zensho", Chamber of Tea Association of Shizuoka Pref., pp 275-276, 1988, edited by Chamber of Tea Association of Shizuoka Pref.

Patent Document

Patent Document 1: JP 2004-208605 A
Patent Document 2: JP 2008-000044 A
Patent Document 3: JP 2003-310161 A
Patent Document 4: JP 2002-34457 A
Patent Document 5: JP 2005-058210 A
Patent Document 6: JP 07-135902 A
Patent Document 7: JP 2009-291160 A

DISCLOSURE OF THE INVENTION

Problem to be Solved by the Invention

In Japan, a green tea was usually drunk in a warm state which was made with a teapot and the like from the past. However, with prevalence of a green tea beverage packed in a container such as a green tea beverage packed in a PET bottle and the like, new problems have occurred. In other words, in a case of a green tea beverage packed in a container, the green tea beverage packed in a container is stored for a while after being produced, and thus during this time, quality stability of no temporal deterioration such as generation of sediments and brownish discoloration, is demanded. In addition, a green tea beverage packed in a container is often drunk in a cold state, and thus is demanded to be capable of being drunk deliciously even in a cold state. Furthermore, since a green tea beverage packed in a container is produced industrially, raw tea leaves that allow effective extraction of delicious tea for a short time, are demanded. These points are the same for raw tea leaves for a tea bag.

Therefore, the present inventors suggested raw tea leaves prepared by adjusting the ratio of the content of theanine relative to total weight of dry tea leaves, and the weight ratio of the content of monosaccharides relative to the content of caffeine to certain conditions as new raw tea leaves that allow effective extraction of delicious tea for a short time, and are especially suitable in a tea beverage packed in a container that is often drunk in a cold state (Japanese Patent Application No. 2009-100648).

Meanwhile, in a case where low caffeine treatment, for example, such as decocting or warm water shower was uniformly performed for various raw tea leaves for a beverage that are different in the plucking season, the maturity of sprout, the site of tea, cultivation conditions, and the like, the concentration feeling of a tea fluid obtained after extraction became difficult to be sensed. Therefore, any technical resolving means was necessary in order to maintain the concentration feeling.

Therefore, in order to provide tea leaves for extraction of a green tea beverage that are suitable as a raw tea for a green tea beverage packed in a container that is filled into a container such as a can and a PET bottle, or as a raw tea that is filled into a tea bag or the like, the invention provides new tea leaves for extraction of a green tea beverage that allow extraction of a green tea beverage that has good quality stability when stored, and can be drunk deliciously without harm of the concentration feeling even in a cold state, preferably tea leaves for extraction of a green tea beverage that allow effective extraction of delicious tea for a short time.

Means for Solving Problem

To solve such problems, the invention suggests tea leaves for extraction of a green tea beverage, which are having a content of caffeine relative to the total mass of dry leaves being 0.2 to 2.5% by mass, in which the relation of the mass fraction X (%) of the theanine content relative to the total mass of dry tea leaves, with the mass fraction Y of the monosaccharide content relative to the amount of fiber satisfies the following condition (1).

$$-0.007X+0.024 \leq Y \leq -0.011X+0.039 \quad (1)$$

The present inventors earnestly studied raw tea leaves for a green tea beverage that have a balance of flavors despite low caffeine treatment, and as the results, found that a delicious green tea beverage is obtained which has enhanced concentration feeling with theanine, which is involved in delicious taste, and monosaccharides, which are involved in the taste, and has a balance of flavors using theanine that greatly changes depending on the tea season, and a fiber component that changes likewise depending on the tea season as a marker, and has alleviated bitter taste and astringent taste, and has no lack of concentration feeling sensed in the tea leaves by caffeine-reducing treatment by performing process or adjustment of the raw tea leaves by adjusting monosaccharides, which change with drying, with processing. In addition, the present inventors found that the green tea beverage obtained by extracting such tea leaves has good quality stability even when stored, has no lack of the concentration feeling sensed, and can be drunk deliciously.

Furthermore, since the tea leaves for extraction of a green tea beverage allow effective extraction of delicious tea for a short time by means of adjustment of the consolidation ratio to 0.85 to 0.95, the tea leaves for extraction of a green tea beverage are suitable for industrial production of a green tea beverage packed in a container. In addition, since the tea leaves for extraction of a green tea beverage can be extracted for a short time, the tea leaves for extraction of a green tea beverage are also suitably used as a green tea contained in a tea bag.

Consequently, the tea leaves for extraction of a green tea beverage of the invention can be suitably used as raw tea leaves for extraction of a green tea beverage that are filled into a container such as a can and a PET bottle, or as tea leaves that are filled into a tea bag and the like.

BRIEF DESCRIPTION OF THE DRAWINGS

FIG. 4 is a photograph that illustrates one example of the appearance of tea leaves preferred in the invention.

FIG. 5 is an enlarged photograph of the inside of the tea leaves of FIG. 4.

FIG. 6 is a photograph that illustrates one example of the appearance of conventional tea leaves.

FIG. 7 is an enlarged photograph of the inside of the tea leaves of FIG. 6.

MODE(S) FOR CARRYING OUT THE INVENTION

Figure 1:
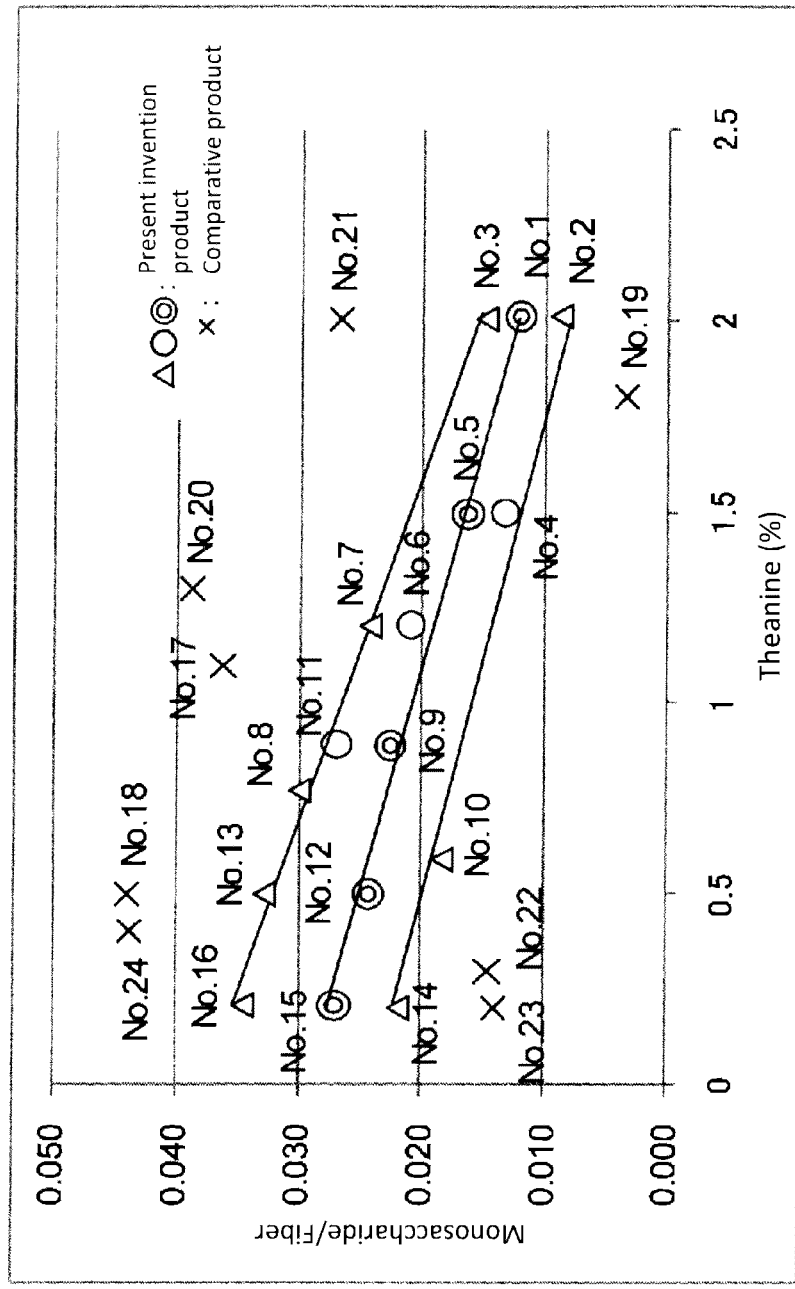
FIG. 1 is a graph in which the measurement values for sample Nos. 1 to 24 obtained in Test 1 are plotted in a coordinate where the X axis is the mass fraction (%) of the theanine content, and the Y axis is the mass fraction of the monosaccharide content relative to the amount of fiber.

Hereinafter, one embodiment of the invention will be described. However, the scope of the invention is not limited to this embodiment.

<Tea Leaves for Extraction of a Green Tea Beverage>

The tea leaves for extraction of a green tea beverage in the present embodiment (hereinafter, referred to as the "present tea leaves for extraction") are caffeine-reduced tea leaves that have a certain relation of the fraction of the theanine content, with the mass fraction of the monosaccharide content relative to the amount of fiber contained in tea leaves.

(Kind of Tea)

The present tea leaves for extraction are leaves or stems of a tea plant (*Camellia sinensis*) or processed tea leaves produced from them as raw materials, and may be a green tea as a unfermented tea such as a decocted tea, a refined green tea, a stem tea, a Kabusecha tea, a Tencha tea, a powdered green tea, a Bancha tea, a roasted green tea, an oven-roasted tea, or may be a flower tea in which these green teas are flavored with aroma such as jasmine, lotus, Sweet Olive, citron, and chrysanthemum.

(Composition of Tea Leaves)

The content of caffeine relative to the total mass of dry leaves in the present tea leaves for extraction is importantly 0.2 to 2.5% by mass.

When the content of caffeine of tea leaves is 0.2 to 2.5% by mass, it is possible to obtain tea leaves that allow extraction of a green tea beverage, which has sufficiently low content of caffeine in comparison to an amount of caffeine of tea leaves raised by coating cultivation such as a new sprout of the first tea-crop or the second tea-crop which has high content of caffeine, a refined green tea, or a Kabusecha tea, and a Tencha tea, and also has good quality stability when stored, and can be drunk deliciously even in a cold state without harm of the concentration feeling by means of adjusting the content of theanine, the amount of fiber, and the content of monosaccharides to certain ranges.

From such viewpoint, the content of caffeine relative to the total mass of dry leaves is importantly 0.2 to 2.5% by mass, particularly 0.7% by mass or more and 2.0% by mass or less, and further preferably 1.2% by mass or more and 1.5% by mass or less.

The amount of caffeine of tea leaves changes depending on the tea season, the breed, or the cultivation conditions. Particularly, it is possible to reduce the amount of caffeine to some degree by selecting tea leaves since the content of caffeine increases in young tea leaves picked in the early period of each tea season. However, in order to adjust the content of caffeine to the desired degree in the invention, the amount of caffeine of tea leaves is preferably reduced by caffeine-reducing treatment such as hot water treatment, hot water shower, flowing water washing, and hydrous organic solvent washing.

In addition, the relation of the mass fraction X (%) of the theanine content relative to the total mass of dry tea leaves, with the mass fraction Y of the monosaccharide content relative to the amount of fiber in the present tea leaves for extraction importantly satisfies the following condition (1).

$$-0.007X+0.024 \leq Y \leq -0.011X+0.039 \qquad (1)$$

As illustrated in FIG. 1 of Examples described below, the relation of the mass fraction X (%) of the theanine content, with the mass fraction Y of the monosaccharide content relative to the amount of fiber was studied. As the results, it was found out that tea leaves of which Y is present between $Y=-0.007X+0.024$ and $Y=-0.011X+0.039$, allow extraction of a green tea beverage that has good quality stability when stored, and can be drunk deliciously even in a cold state without lack of concentration feeling sensed.

Furthermore, it was found out that tea leaves which satisfies the condition of $-0.008X+0.028 \leq Y \leq -0.010X+0.032$ is further preferable.

In preparation of tea leaves so as to satisfy such condition (1), it is preferable to produce tea leaves with attention to the following viewpoints.

The content of theanine of tea leaves is affected by coating cultivation, tea season and the like. For example, in a case of a new sprout, or in a case where the tea season is early and the amount of fiber is small, the content of theanine tends to be large, and in a case where the tea season is delayed and the amount of fiber is high, the content of theanine tends to decrease. Accordingly, the content of theanine may be adjusted with the tea season, outgrowth of sprout, and further coating treatment, and the like.

The amount of fiber changes depending on the tea season, the breed, the quality, or the sprout growth. Particularly, the amount of fiber is large in the third tea-crop, the fourth tea-crop, and the autumn/winter tea-crop, and the amount of fiber increases in the late period of each tea season of from the first tea-crop to the fourth tea-crop and the autumn/winter tea-crop. Accordingly, the amount of fiber may be adjusted by selecting tea leaves from such viewpoint.

However, a method of adjusting the mass fraction of monosaccharides by performing a certain drying treatment is most effective in preparation of tea leaves that satisfy the condition (1).

Specifically, in a conventional drying method, tea leaves are dried with hot wind for a long time. However, tea leaves and the like are dried instantly with heating by direct flame heat for a short time, and the temperature and the heating time of the direct flame heat are regulated at this time, whereby to adjust the mass fraction of monosaccharides, and produce tea leaves that satisfy the condition (1). If the heating temperature is high, monosaccharides tend to decrease.

More specifically, instead of conventional limping and rough rolling for tea leaves, tea leaves are preferably brought into contact with a hot body heated to 105 to 165° C., particularly 115 to 155° C., preferably 125 to 145° C. for 5 seconds to 40 seconds, preferably 10 seconds to 20 seconds as primary drying. However, the method is not limited to this method.

At this time, if the fraction Y of monosaccharides is higher than a desired value, the heating temperature may be elevated at the time of the primary drying.

Furthermore, the "monosaccharides" in the invention refers to glucose and fructose.

The present tea leaves for extraction preferably further satisfy the following condition (2).

$$X = 0.2 \text{ to } 2.0(\%) \qquad (2)$$

If the mass fraction (%) of the theanine content relative to the total mass of dry tea leaves is 0.2% or more, the tea leaves are excellent in flavor stability and have good extraction stability. If the mass fraction (%) of the theanine content relative to the total mass of dry tea leaves is 2.0% or less, the tea leaves are excellent in extraction stability and also have good flavor stability.

From such viewpoint, the mass fraction (%) of the theanine content relative to the total mass of dry tea leaves is preferably 0.5 to 1.6%, and further particularly preferably 0.7 to 1.7%.

(Form of Tea Leaves)

Conventional tea leaves are shaped to a rod-like form such as a needle by twisting one piece of tea leaf (see FIGS. 6 and 7). However, tea leaves in a massive form in which plural tea leaves gather, and which has a space in the inside, are preferable for extraction of a green tea beverage (see FIGS. 4 and 5).

In a case of a green tea beverage packed in a container or green tea in a tea bag, it is demanded to extract a green tea effectively for a short time. It was revealed that tea leaves in a massive form in which plural tea leaves gather, and which has a space in the inside, allow effective extraction of a green tea for a short time, when compared to the conventional tea leaves that are formed to a rod-like form such as a needle by twisting one piece of tea leaf.

However, the massive form is not particularly limited in its shape, but means any shape, for example, of spherical body, ellipsoidal spherical body, cylindrical body, rectangular body, and the like.

Figure 3:
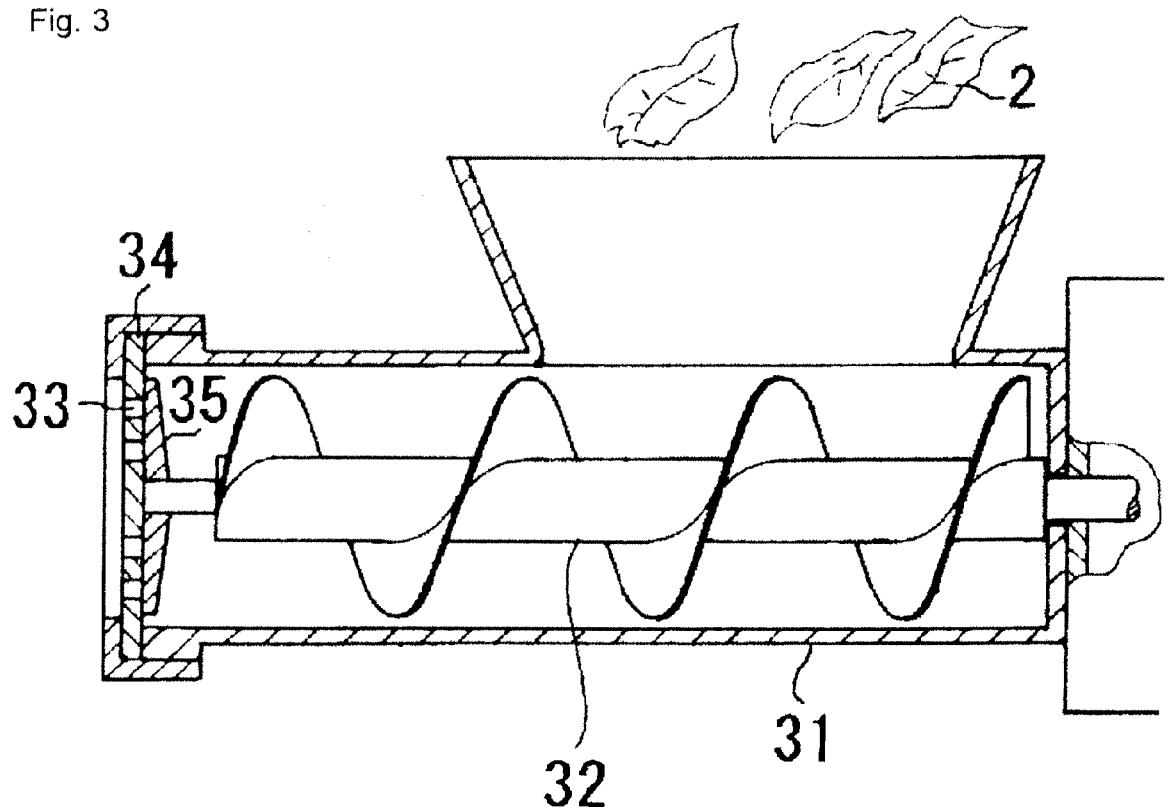
FIG. 3 is a drawing that illustrates one example of a rolling and shaping device that is used in production of the present tea leaves for extraction.

In forming such form, rolling and shaping may be performed, for example, using the device as illustrated in FIG. 3 described below. However, the method is not limited to this method.

(Consolidation Ratio)

The ratio when the tea leaves are consolidated (called "consolidation ratio") is one marker that represents the form of the tea leaves as described above, and the consolidation ratio in the present tea leaves for extraction is preferably in a range of 0.85 to 0.95.

If the consolidation ratio of the present tea leaves for extraction is in a range of 0.85 to 0.95, the present tea leaves are excellent in effective extraction, and allow effective extraction of delicious green tea for a short time. From such viewpoints, the consolidation ratio is preferably 0.88 to 0.93, and particularly more preferably 0.89 to 0.91.

If the extraction rate of tea leaves and the like is too slow, the extraction should be done for a long time, and thus is not effective, and unwanted coarse taste in a tea extraction liquid is likely to be extracted together, and thus it is not desirable. If the extraction rate of tea leaves and the like is too fast, the extraction is effective, but adjustment of extraction to adjust the flavor becomes difficult and burden of filtration increases.

In adjustment of the consolidation ratio of the present tea leaves for extraction to the above-mentioned range, rolling and shaping may be performed, for example, using the device as illustrated in FIG. 3 described below. However, the method is not limited to this method.

Furthermore, the "consolidation ratio" of the tea leaves prescribed in the invention is a ratio of the "consolidated bulk density" measured when tea leaves are filled into a container under vibration, relative to the "loose bulk density" measured when tea leaves are naturally dropped and filled into a container.

Consolidation ratio="consolidated bulk density"/"loose bulk density"

<Production Method>

Hereinafter, a preferable production method for the present tea leaves for extraction will be described, but the production method for the present tea leaves for extraction is not limited thereto.

The present tea leaves for extraction is preferably subjected to caffeine-reducing treatment whereby to reduce the amount of caffeine of the tea leaves. The method of the caffeine-reducing treatment of the tea leaves is not particularly limited, and, for example, a method of decocting with 80 to 100° C. hot water, a method of subjecting to supercritical treatment, a method of contacting with a hydrogen ion exchange resin, a method of contacting with active white earth or acidic white earth, or the like may be adopted.

Figure 2:
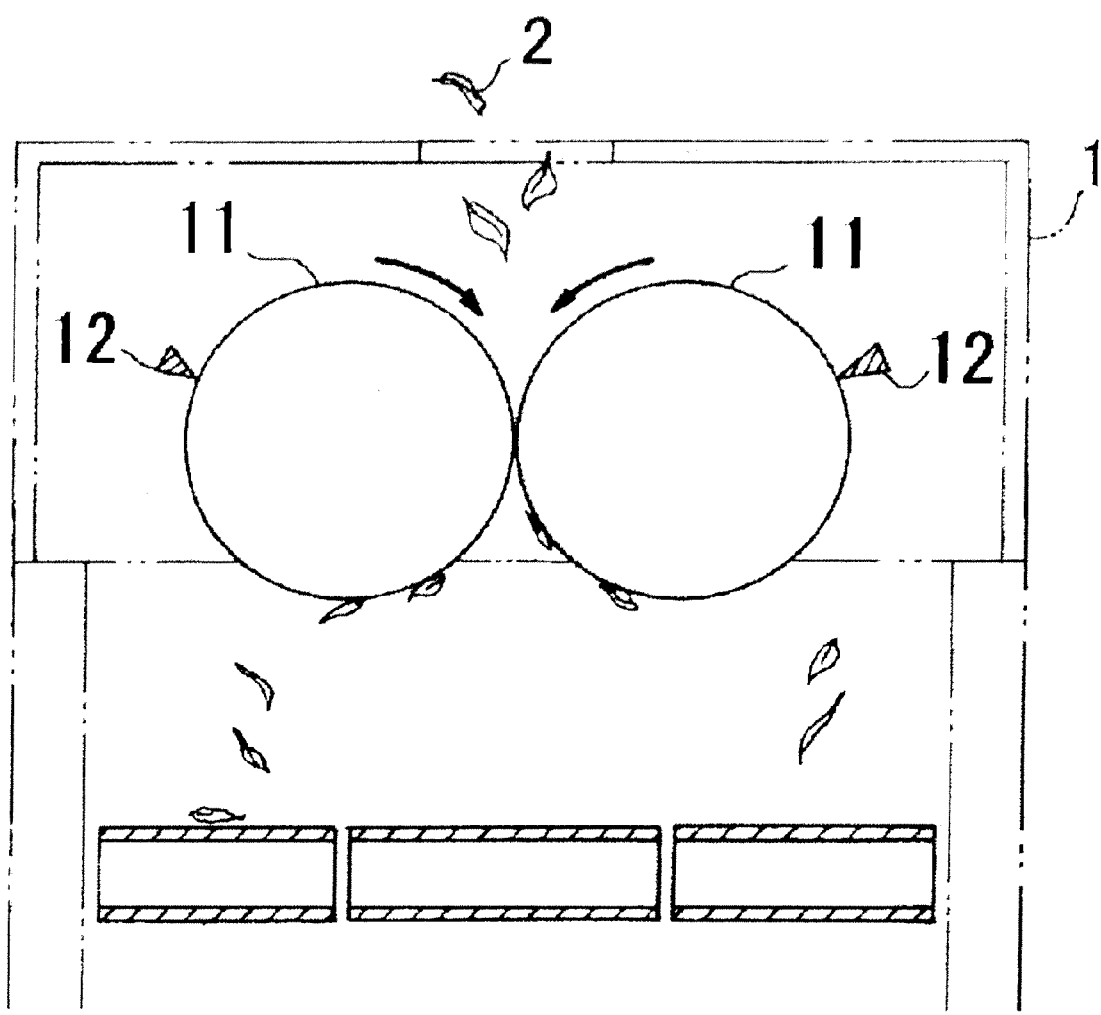
FIG. 2 is a drawing that illustrates one example of a primary drying device that is used in production of the present tea leaves for extraction.

The present tea leaves for extraction can be suitably produced by subjecting the tea leaves, which have been through such caffeine-reducing treatment, to steaming treatment as necessary, and then conducting primary drying for the steamed tea leaves with a device illustrated in FIG. 2 to adjust the moisture amount of the tea leaves, and then conducting rolling and shaping by rolling the tea leaves and extruding them from pores under pressure with a device illustrated in FIG. 3, and then performing secondary drying with blowing hot wind of 80° C. in a drying device.

However, the production method is not limited to such production method.

In the primary drying described above, as illustrated in FIG. 2, tea leaves are put in between two rotation rollers (hot body) 11 and 11, that are heated to 105 to 165° C., whereby to bring the tea leaves into contact with the heated rollers 11 and pressurize the tea leaves between the rollers 11 and 11 whereby to push and crush hardly-dried region of tea leaves (a portion of the stem or core), and attach the tea leaves to the surface of the rollers 11 as they are for 5 seconds to 40 seconds to perform heat drying, and scratch off and separate the tea leaves from the roller surface with an object 12 such as a spatula.

In this case, the time when the tea leaves are attached to the roller surface becomes the drying time.

In addition, in the primary drying, the tea leaves (including stem) are pressurized preferably such that the thickness of the tea leaves is equal to or less than 0.4 mm, preferably in a range of 0.1 mm to 0.4 mm, and further preferably in a range of 0.2 mm to 0.3 mm. In addition, the primary drying is preferably conducted such that the moisture amount of the tea leaves is 30 to 70% by mass, and particularly about 40 to 60% by mass.

The rolling and shaping described above can be carried out with a device illustrated in FIG. 3, specifically, a device 3 having a conveying screw 32 that rotates in a cylinder 31; a plate 34 that has multiple pores 33 attached on the exit of the cylinder 31; and a knife 35 that rotates in the vicinity of the plate 34. By using this device, it is possible to pressure-feed the tea leaves under rolling with the conveying screw 32 toward the exit direction, extrude the tea leaves 2 from the pores 33 of the plate 34, and cut the tea leaves 2 with the knife 35 that rotates while being in sliding contact with the inner surface of the plate 34 to shape a massive form of the tea leaves.

If the tea leaves are subjected to rolling and shaping as described above, the tea leaves are different from conventional ones formed as a hard rod-like form such as a needle by twisting one piece of tea leaf, and can be shaped to a massive form in which plural tea leaves gather, and which has a space in the inside.

Furthermore, the degree of rolling, the shape of tea leaves after the treatment and the like may be adjusted by the rotation rate of the conveying screw, the pore size of the plate, and the like.

The rotation rate of the conveying screw is preferably 40 rpm to 400 rpm, particularly 60 rpm to 300 rpm.

In addition, the pore diameter of the plate, in other words, the diameter of the pore into which the tea leaves are extruded is preferably formed to be 6.0 mm to 16 mm, particularly 6.0 mm to 12.8 mm. This pore is preferably formed in a ratio of 0.20 $m^2$ to 0.50 $m^2$, particularly preferably 0.25 $m^2$ to 0.45 $m^2$, and further preferably 0.30 $m^2$ to 0.40 $m^2$ per 1 $m^2$. The time taken from the input to the extrusion of the tea leaves is preferably 5 seconds to 30 seconds, particularly preferably 5 seconds to 20 seconds.

In addition, the rolling and shaping process is preferably performed with cooling such that the product temperature not becomes 40° C. or more, preferably 30° C. or more in order to prevent deterioration of the quality.

At this time, the cooling means may be any means, such as cooling the device with cooling water and the like, or cooling the device with input of ice or dry ice along with the tea leaves.

Specific means of the secondary drying is not particularly limited, and a drying method performed from the past may be adopted, and the drying is preferably performed to 5 to 10% by mass of the moisture amount of the leaves.

Furthermore, the tea leaves obtained from the secondary drying may be used as raw tea leaves for extraction for production of a green tea beverage packed in a container as they are, but may be further subjected to, for example, homogenization treatment of the particle size or the shape of Aracha tea in order to achieve the extraction efficiency and homogenization of extraction components, or may be subjected to firing treatment in order to modify the flavor. In addition, the tea leaves may be subjected to a treatment of pulverization to obtain fine particle size in order to be filled into a tea bag.

In a case where tea leaves are subjected to low caffeine treatment, hot water treatment, hot water shower, flowing water washing, hydrous organic solvent washing, or the like is usually performed. Since the surfaces of live tea leaves contain water by such low caffeine treatment, the moisture amount tends to increase than normal live tea leaves such as dew leaves, rain leaves, or wash leaves, and thus means to dry the tea leaves is important. In addition, if the amount of fiber is small, the moisture amount tends to increase, and thus also from this point, means to dry the tea leaves is important.

As described above, by the primary drying of the tea leaves having moisture on the surface to dry the tea leaves for a short time, it is possible to suppress the influence on the water color and the flavor after production of the beverage. Furthermore, by adjusting theanine, which is a delicious component, and monosaccharides, which are sweet taste components with the amount of fiber, it is possible to produce raw tea leaves for a low-caffeine beverage that has suppressed bitter astringent taste, and has the concentration feeling.

<Use>

Hereinafter, preferable use of the present tea leaves for extraction will be described. However, the use of the present tea leaves for extraction is not intended to be limited to the uses described below.

(Tea Leaves Packed in Container)

The present tea leaves for extraction may be sold as enclosed in various package containers.

At this time, the package container may be any container made of a paper, vinyl, a metal, a plastic, or a complex thereof, and the tea leaves once packaged may be also further enclosed in the same or another kind of a package container.

Herein, the package container may be any container such as a box, a bag, or a container similar to them, and the shape or color of the package container is not particularly limited. However, the package container is particularly preferably those excellent in light blocking effect or oxygen barrier properties in consideration of weakness of the tea leaves to deterioration by light, oxygen, or moisture.

(Tea Bag)

The present tea leaves for extraction may be enclosed in a tea bag in consideration of convenience. At this time, a known method may be suitably used with regard to a size, a material or a shape of a tea bag, or presence or absence of a tag, and the like.

The amount of the present tea leaves for extraction to be enclosed in a tea bag may be selected in consideration of deliciousness or flavoring property of the extraction liquid and effectiveness of extraction.

(Raw Material for Instant Tea)

The present tea leaves for extraction may be also used as a raw material for an instant tea.

In order to process the present tea leaves for extraction as an instant tea, for example, the present tea leaves for extraction are subjected to pulverization and granulation process, to obtain granular tea powders. At this time, the stem portion contained in tea leaves and the like may be instantly pulverized before or at the same time as the drying process by being compacted to equal to or less than 0.1 mm, whereby to produce an instant tea excellent in tea water color and freshness.

(Raw Tea for Beverage Packed in Container)

The present tea leaves for extraction may be suitably used as a raw tea for extraction of a green tea beverage packed in a container.

The green tea beverage packed in a container refers to those commercialized by filling a green tea beverage into a tight-seal container such as a metal can, a plastic container, a PET bottle, a glass bottle, and a paper container. Particularly, a technique of suppressing flock is strongly demanded particularly for a transparent container such as a PET bottle, a transparent plastic container, and a glass bottle, of which the appearance has a great influence on the value of a commercial product.

Herein, one example of a production method for a green tea beverage packed in a container will be explained.

First, the present tea leaves for extraction, which are a raw material, are extracted with 20 to 50 weight folds of water. The extraction time and temperature are suitably adjusted depending on the kind of tea leaves used, demanded quality or deliciousness of a tea beverage (for example, extraction at low temperature gives stronger delicious taste and extraction at high temperature gives stronger astringent taste) and the like, but the extraction is conducted usually at 45 to 95° C. for 3 to 30 minutes, along with stirring during the extraction procedure if necessary.

Then, insoluble objects such as tea dregs are removed by filtration, centrifugation, and the like to obtain a tea extraction liquid. To this tea extraction liquid, water is added for dilution to a suitable concentration for drinking, and 100 to 2000 ppm of ascorbic acid or a salt thereof or the like is added to prevent oxidation, or 100 to 2000 ppm of sodium hydrogen carbonate or the like is added to adjust pH to 5.0 to 7.0, and other additives are added if necessary to obtain a blend liquid of a tea beverage.

Then, the blend liquid of the tea beverage obtained as described above is filled into a tight-seal container such as a metal can, a plastic container, a PET bottle, a glass bottle, and a paper container and is sterilized to produce a green tea beverage packed in a container.

As the green tea beverage packed in a container, brown rice or leaves, stems, or roots of various vegetables may be blended and extracted with the present tea leaves for extraction.

In addition, to the green tea extraction liquid, an extraction liquid or extract obtained by extraction of brown rice or leaves, stems, or roots of various vegetables, may be added, or a catechin composition obtained by purification of the green tea extraction liquid (for example, THEAFLAN 30 or 90, or the like manufactured by ITO EN, LTD.) may be added, and in addition, an antioxidant, a preservative, a cyclic oligomer, a dietary fiber, an emulsifier, a colorant, a perfume, a stabilizer, a pH adjusting agent, an acidulant, a sweetener, a fruit juice, a nutrient reinforcement agent, or the like may be added alone or in combination.

In addition, in order to supplement or augment the effects of flock suppression or prevention in a tea beverage packed in a container, if necessary, a known method of suppressing or preventing flock generation, for example, a method of decomposing aqueous polymeric polysaccharide components by enzyme treatment, a method of physically removing a causative substance or a precipitate (flock) by ultrafiltration or diatomaceous earth filtration, a method of adding a flock-suppression substance, or the like may be incorporated into the production process of the tea beverage packed in a container.

EXPLANATION FOR TERMS

When the "major component" is expressed in the detailed description of the present invention, it comprises a meaning that other components may be included unless it impedes a function of the major component. At this time, the content ratio of the major component is not specified, and an extraction liquid or extract obtained by extraction of a green tea, preferably takes up 50% or more by mass, particularly 70% or more by mass, and particularly 80% or more (including 100%) by mass in the beverage except the moisture.

In addition, the "green tea beverage packed in a container" means a green tea beverage which is filled into a container, and also means a green tea beverage that can be drunk without dilution.

When "X to Y" (X and Y are any number) is expressed in the present specification, it means "X or more and Y or less", and encompasses the meaning of "preferably greater than X" and "preferably less than Y".

EXAMPLES

Hereinafter, Examples of the present invention will be explained in more detail. However, the present invention is not limited to the Examples.

[Test 1]

For tea leaves prepared by a different production method from a conventional one, analysis and evaluation were conducted, and characteristics of the components and evaluation results were studied.

<Sample Nos. 1 to 16>

Among live tea leaves (produced in Shizuoka Prefecture, Yabukita species) plucked in a tea season of early in May to early in October, live tea leaves having 0.2 to 2.00 of the theanine amount were selected, and the selected live tea leaves were decocted with 80° C. to 95° C. warm water for 15 to 120 seconds, or subjected to warm water shower treatment with 80° C. to 95° C. warm water (70 to 80% moisture rate). Then, the tea leaves were pressurized, pushed and crushed using a primary drying device shown in FIG. 2 (0.3 mm gap between rollers), and brought into contact with heating rollers heated to 120° C. to 150° C. for 3 seconds to 60 seconds, to obtain 0.3 mm thickness and 30 to 70% moisture rate of the tea leaves (including the stem). Then, rolling and shaping were conducted (30 to 70% moisture rate) using a device shown in FIG. 3 (for the pores of the plate, pores having 9.5 mm diameter were drilled in a ratio of 0.3 m² per 1 m², and the diameter of the conveying screw was 55 mm, and the length of the conveying screw was 250 mm) at 230 rpm of the conveying screw rotation rate, 20 seconds of the rolling and shaping time, and 30 to 40° C. of the product temperature in the pressure feed, and then secondary drying was conducted at the condition of 80° C. to obtain raw tea leaves for a beverage (sample) (5 to 10% moisture rate).

Furthermore, the thickness of the tea leaves (including the stem) was adjusted to 0.3 mm by regulating the gap between the two parallel heating rollers to 0.3 mm.

<Sample Nos. 17 to 19>

Among live tea leaves (produced in Shizuoka Prefecture, Yabukita species) plucked in a tea season of early in May to early in October, live tea leaves having 0.5 to 1.8% of the theanine amount were selected, and the selected live tea leaves were treated with steaming for 30 seconds with zero pressure vapor using a continuous conveying belt-type steamer (70 to 80% moisture rate). Then, the tea leaves were subjected to cooling, rough rolling, rolling, secondary drying, refined rolling, and drying in a similar manner to conventional one, to obtain raw tea leaves for a beverage (sample).

Furthermore, the temperature and the time in each process of rough rolling, rolling, secondary drying, refined rolling, and drying according to a standard process were set as follows:

Rough rolling: 110° C. and 5 minutes in initial stage, and 80° C. and 30 to 40 minutes in intermediate and last stages Rolling: 60° C., 20 minutes Secondary drying: 90° C., 30 to 40 minutes Drying: 80° C., 30 to 40 minutes <Sample Nos. 20 to 24>

Among live tea leaves (produced in Shizuoka Prefecture, Yabukita species) plucked in a tea season of early in May to early in October, live tea leaves having 0.2 to 2.0% of the theanine amount were selected, and the selected live tea leaves were decocted with 80° C. to 95° C. warm water for 45 to 90 seconds, or subjected to warm water shower treatment with 80° C. to 95° C. warm water (70 to 80% moisture rate). Then, the tea leaves were subjected to cooling, rough rolling, rolling, secondary drying, refined rolling, and drying in a similar manner to conventional one, to obtain raw tea leaves for a beverage (sample).

Furthermore, the temperature and the time in each process of rough rolling, rolling, secondary drying, refined rolling and drying according to a standard process were set as follows:

Rough rolling: 110° C. and 5 minutes in initial stage, and 80° C. and 30 to 40 minutes in intermediate and last stages Rolling: 60° C., 20 minutes Secondary drying: 90° C., 30 to 40 minutes Drying: 80° C., 30 to 40 minutes <Analysis of Sample>

The components of each of the sample Nos. 1 to 24 obtained were analyzed in a method described below.

(Analysis Method for Content of Theanine and Amount of Fiber)

Each sample (raw tea leaves for a beverage) was pulverized with a cyclone mill manufactured by UDY CORPORATION, and filled into an exclusive cell, and then the theanine content and the amount of fiber were determined with INSTALAB 600 near-infrared analyzer manufactured by Shizuoka-Seiki Corporation, and the content of theanine (% by mass) and the content of fiber (% by mass) relative to the total mass of dry tea leaves were calculated, and these values were shown as the "theanine (%)" and "fiber (%)".

(Analysis Method for Saccharide)

According to the following analysis method, the ratio of the content of monosaccharides (% by mass) relative to the total mass of dry tea leaves was measured.

At this time, quantity-determined monosaccharides are glucose and fructose.

(1) Method of Adjusting Sample 50 mg of pulverized tea leaves was taken, and extracted with ultrasonic wave with 50 mg of ultrapure water for 15 minutes. 500 μL of the extracted sample was taken, added with 100 μL of 100 mM NaCH, 100 μL of 50 ppm Lactose, and 400 μL of ultrapure water, and stirred, and 100 μL of the sample was filled into Bond Elute SAX (produced by GL Sciences Inc.), and the pass-through was discarded, and then further 300 μL of the sample was filled, and the pass-through was recovered to prepare a sample.

(2) Analysis Condition

Analysis device: HPLC saccharide analysis device manufactured by Dionex Corporation Column: Carbopack PA1 (4.6 mm×250 mm) (P/N35391 manufactured by Dionex Corporation)

Column temperature: 30° C.

Flow Rate: 1.0 mL/min

Gradient condition: See Table 1 below

TABLE 1

| TIME (min) | Phase A (%) | Phase B (%) | Phase C (%) | Flow (ml) |
| --- | --- | --- | --- | --- |
| INITIAL | 15 | 0 | 85 | 1 |
| 14 | 15 | 0 | 85 | 1 |
| 30 | 100 | 0 | 0 | 1 |
| 31 | 0 | 100 | 0 | 1 |
| 40 | 0 | 100 | 0 | 1 |
| 41 | 15 | 0 | 85 | 1 |
| 55 | 15 | 0 | 85 | 1 |

(Analysis Method for Caffeine)

The ratio of the content of caffeine (% by mass) relative to the total mass of dry tea leaves was measured with the following analysis method.

(1) Preparation Method for Sample 200 mg of the pulverized tea leaves were taken, and extracted with ultrasonic wave using 100 mL of 20% acetonitrile for 60 minutes. The extraction liquid was filtered with a membrane filter (0.45 μm) to prepare a sample.

(2) Analysis Condition

Analysis device: Xbridge shield RP18 3.5 mm×150 mm manufactured by Waters Corporation Column temperature: 40° C.

Flow Rate: 0.5 mL/min

Mobile Phase: Phase A water, Phase B acetonitrile, Phase C 1% to phosphoric acid Injection amount: 5 μL Detector: UV Detector UV 230 nm manufactured by Waters Corporation Gradient condition: See Table 2 below

TABLE 2

| TIME (min) | Flow (ml) | Phase A (%) | Phase B (%) | Phase C (%) |
|---|---|---|---|---|
| INITIAL | 0.5 | 83 | 7 | 10 |
| 5 | 0.5 | 83 | 7 | 10 |
| 7 | 0.5 | 80 | 10 | 10 |
| 12 | 0.5 | 72 | 18 | 10 |
| 23 | 0.5 | 65 | 25 | 10 |
| 30 | 0.5 | 30 | 60 | 10 |
| 40 | 0.5 | 83 | 7 | 10 |

<Measurement of Consolidation Ratio>

The consolidation ratio of the sample (tea leaves) was measured as described below.

100 g of each sample was exactly taken, and naturally dropped to a 1000 mL mass cylinder, and the volume was measured, which was assumed as the "loose bulk density". Then 100 g of each sample was exactly taken, and put into a 1000 mL mass cylinder, and the mass cylinder was vibrated with forcible hitting on the bottom to eliminate gaps, and then the volume was measured, which was assumed as the "consolidated bulk density", and the "consolidation ratio" was calculated by the following equation.

Consolidation ratio="Consolidated bulk density"/"loose bulk density"

<Evaluation of Beverage Obtained from Sample>

A beverage packed in a container was prepared from each of the obtained samples Nos. 1 to 24, and the flavor, the bitter astringent taste, the stability, the concentration feeling, and the like immediately after production and after storage of the beverage were evaluated as described below.

(Preparation of Beverage Packed in Container)

10 g of each sample (raw tea leaves) was extracted with 1000 mL of 70° C. distilled water for 3.5 minutes, and the residue was removed with a mesh (150 mesh). The obtained extraction liquid was rapidly cooled to room temperature, and further subjected to centrifugation (7000 rpm, 10 minutes) to remove insoluble fractions, and then L-ascorbic acid was added in 300 ppm relative to the blend mass-up amount, and the mixture was adjusted to pH 6.0 with sodium bicarbonate, and the obtained blend liquid was subjected to UHT sterilization at 133 to 135° C. for 30 seconds, and then filled into a PET bottle and rapidly cooled to obtain a tea beverage packed in a container.

(Storage of Beverage Packed in Container)

The tea beverage packed in a container prepared as described above was stored for 7 days at room temperature.

(Evaluation for Flavor of Beverage)

The beverage immediately after the production and the beverage after the storage were cooled to 5° C., and then drunk by 5 panelists, respectively, and the evaluation for odor or taste was performed on the following standards.

=Standards for Flavor Evaluation=

1: Very good
2: Good
3: Somewhat Inferior
4: Inferior (Evaluation for Bitter Astringent Taste of Beverage)

The beverage immediately after the production and the beverage after the storage were cooled to 5° C., and then drunk by 5 panelists, respectively, and the evaluation for bitter astringent taste was performed on the following standards.

=Standards for Bitter Astringent Taste Evaluation=

1: Very good
2: Good
3: Somewhat Inferior
4: Inferior (Evaluation for Stability of Beverage)

The situation for sediment generation of the beverage after the storage was visually observed, and the evaluation was performed on the following standards.

=Standards for Stability Evaluation=

+++: Large precipitate
++: Some precipitate
+: Slight precipitate
−: No precipitate (Evaluation for Concentration Feeling of Beverage)

The beverage (5° C.) immediately after the production was drunk by the 5 panelists, and the evaluation for concentration feeling was performed.

=Evaluation for Concentration Feeling=

1: Very good
2: Good
3: Somewhat Inferior
4: Inferior (Total Evaluation)

The evaluations for the flavor, the bitter astringent taste, stability of the beverage, and concentration feeling of the beverage in a cold state were generalized and the samples were collectively evaluated by the standards as described below.

=Standards for Total Evaluation=

⊙: Very excellent
○: Excellent
Δ: Somewhat Inferior
x: Inferior

TABLE 3

| | Product of Present Invention (Low-caffeine Treatment) | | | | | | | |
|---|---|---|---|---|---|---|---|---|
| Sample No. | 1 | 2 | 3 | 4 | 5 | 6 | 7 | 8 |
| Method of Low-caffeine Treatment | Decocting | Decocting | Decocting | Decocting | Decocting | Decocting | Decocting | Decocting |
| Treatment temperature (° C.) | 85 | 90 | 90 | 95 | 90 | 95 | 95 | 80 |
| Treatment time (sec) | 30 | 120 | 90 | 30 | 15 | 30 | 90 | 45 |
| Theanine (%) | 2.0 | 2.0 | 2.0 | 1.5 | 1.5 | 1.2 | 1.2 | 0.8 |
| Manosaccharide (%)/Fiber (%) | 0.0120 | 0.0087 | 0.0159 | 0.0143 | 0.0160 | 0.0207 | 0.0250 | 0.0307 |

TABLE 3-continued

| | | | | | | | | | |
|---|---|---|---|---|---|---|---|---|---|
| Caffeine (%) | | 1.2 | 0.3 | 0.5 | 0.8 | 1.3 | 1.0 | 0.2 | 2.3 |
| Consolidation ratio | | 0.9 | 0.85 | 0.85 | 0.88 | 0.9 | 0.89 | 0.85 | 0.95 |
| Primary dry temperature (°C.) | | 135 | 135 | 147 | 120 | 145 | 140 | 145 | 145 |
| Evaluation for flavor | Immediately after production | 1 | 1 | 2 | 1 | 1 | 2 | 1 | 2 |
| | After storage | 2 | 2 | 3 | 2 | 2 | 2 | 2 | 2 |
| Evaluation for Bitter Astringent Taste | Immediately after production | 1 | 2 | 2 | 1 | 1 | 1 | 1 | 3 |
| | After storage | 2 | 3 | 3 | 2 | 2 | 2 | 2 | 3 |
| Stability of Beverage | Immediately after production | − | − | − | − | − | − | − | − |
| | After storage | − | − | + | − | − | − | + | − |
| Evaluation for Concentration Feeling | Immediately after production | 1 | 2 | 2 | 2 | 1 | 1 | 1 | 2 |
| | After storage | 2 | 3 | 2 | 3 | 2 | 2 | 2 | 2 |
| Total Evaluation | | ◎ | Δ | Δ | ○ | ◎ | ○ | Δ | Δ |

| | | Product of Present Invention (Low-caffeine Treatment) | | | | | | | |
|---|---|---|---|---|---|---|---|---|---|
| Sample No. | | 9 | 10 | 11 | 12 | 13 | 14 | 15 | 16 |
| Method of Low-caffeine Treatment | | Decocting | Decocting | Shower | Shower | Shower | Shower | Shower | Shower |
| Treatment temperature (°C.) | | 95 | 80 | 90 | 95 | 85 | 80 | 85 | 85 |
| Treatment time (sec) | | 15 | 60 | 60 | 45 | 30 | 15 | 120 | 15 |
| Theanine (%) | | 0.9 | 0.6 | 0.9 | 0.5 | 0.5 | 0.2 | 0.2 | 0.2 |
| Manosaccharide (%)/Fiber (%) | | 0.0222 | 0.0188 | 0.0275 | 0.0241 | 0.0338 | 0.0231 | 0.0347 | 0.0265 |
| Coffeine (%) | | 1.4 | 2.1 | 1.7 | 1.5 | 2.2 | 2.4 | 1.5 | 2.5 |
| Consolidation ratio | | 0.91 | 0.93 | 0.87 0.87 | 0.89 | 0.9 | 0.87 | 0.91 | 0.86 |
| Primary dry temperature (°C.) | | 137 | 126 | 150 | 135 | 140 | 137 | 143 | 138 |
| Evaluation for flavor | Immediately after production | 1 | 1 | 2 | 1 | 1 | 1 | 1 | 2 |
| | After storage | 1 | 2 | 2 | 1 | 2 | 2 | 1 | 3 |
| Evaluation for Bitter Astringent Taste | Immediately after production | 1 | 2 | 2 | 1 | 2 | 2 | 2 | 2 |
| | After storage | 2 | 2 | 2 | 1 | 3 | 2 | 2 | 3 |
| Stability of Beverage | Immediately after production | − | − | − | − | − | − | − | − |
| | After storage | − | − | − | − | + | + | − | + |
| Evaluation for Concentration Feeling | Immediately after production | 1 | 2 | 1 | 1 | 1 | 2 | 1 | 2 |
| | After storage | 2 | 3 | 2 | 2 | 2 | 3 | 2 | 2 |
| Total Evaluation | | ◎ | Δ | ○ | ◎ | Δ | Δ | ◎ | Δ |

TABLE 4

| | Comparative Product | | | Comparative Product (Low-caffeine Treatment) | | | | |
|---|---|---|---|---|---|---|---|---|
| Sample No. | 17 | 18 | 19 | 20 | 21 | 22 | 23 | 24 |
| Method of Low-caffeine Treatment | — | — | — | Decocting | Decocting | Decocting | Shower | Shower |
| Treatment temperature (°C.) | — | — | — | 85 | 80 | 95 | 95 | 80 |
| Treatment time (sec) | — | — | — | 60 | 90 | 45 | 90 | 120 |
| Theanine (%) | 1.1 | 0.5 | 1.8 | 1.3 | 2.0 | 0.3 | 0.2 | 0.4 |
| Monosaccharide (%)/Fiber (%) | 0.0362 | 0.0438 | 0.0034 | 0.0387 | 0.0267 | 0.0146 | 0.0140 | 0.437 |
| Caffeine (%) | 2.7 | 2.7 | 2.9 | 1.3 | 1.7 | 0.8 | 0.7 | 1.6 |

TABLE 4-continued

| Sample No. | | Comparative Product | | | Comparative Product (Low-caffeine Treatment) | | | | |
|---|---|---|---|---|---|---|---|---|---|
| | | 17 | 18 | 19 | 20 | 21 | 22 | 23 | 24 |
| Consolidation ratio | | 0.81 | 0.82 | 0.80 | 0.79 | 0.75 | 0.79 | 0.78 | 0.79 |
| Primary dry temperature (° C.) | | — | — | — | — | — | — | — | — |
| Evaluation for flavor | Immediately after production | 2 | 3 | 1 | 2 | 2 | 2 | 1 | 3 |
| | After storage | 4 | 4 | 3 | 4 | 3 | 3 | 3 | 4 |
| Evaluation for Bitter Astringent Taste | Immediately after production | 2 | 3 | 2 | 3 | 2 | 1 | 1 | 1 |
| | After storage | 4 | 4 | 3 | 4 | 2 | 2 | 2 | 3 |
| Stability of Beverage | Immediately after production | − | − | − | − | − | + | − | − |
| | After storage | +++ | +++ | − | ++ | ++ | + | − | − |
| Evaluation for Concentration Feeling | Immediately after production | 2 | 3 | 3 | 2 | 2 | 4 | 3 | 2 |
| | After storage | 3 | 3 | 4 | 3 | 2 | 4 | 4 | 2 |
| Total Evaluation | | x | x | x | x | x | x | x | x |

(Results/Discussion)

Based on the results of Table 3 and Table 4, FIG. 1 is a graph in which the measurement values for sample Nos. 1 to 24 are plotted in a coordinate where the X axis is the mass fraction (%) of the theanine content, and the Y axis is the mass fraction of the monosaccharide content relative to the amount of fiber.

As a result, it was found out that tea leaves of which Y is present below Y=−0.011X+0.039 (the uppermost line in FIG. 1) are excellent in the dissolution and the concentration feeling.

On the other hand, it was found out that tea leaves of which Y is present above Y=−0.007X+0.024 (the lowermost line in FIG. 1) have good odor and refreshing flavor.

As a result, it was found out that in the sample Nos. 1 to No. 16 having the content of caffeine relative to the total mass of dry leaves being 0.2% to 2.5%, for any of samples of which Y is present between Y=−0.007X+0.024 and Y=−0.011X+0.039, evaluations for the flavor, the bitter astringent taste, and the concentration feeling immediately after the production and after the storage of the beverage were preferable, and further stability was good.

In addition, it was recognized that there is a tendency that the evaluations described above were preferable for samples of which Y is present between Y=−0.008X+0.028≦Y≦−0.010X+0.032.

[Test 2]

Representative samples were selected from the samples (tea leaves) obtained in Test 1, and observed for the shape of the samples, and measured for the consolidation ratio, and studied for the relation of the consolidation ratio with the filtration rate, the extraction rate, the concentration feeling, and the like.

<Measurement of Filtration Rate>

10 g of each sample (raw tea leaves) was extracted with 1000 mL of 70° C. distilled water for 3.5 minutes, and the tea leaves were removed, and then the extraction liquid was filtered with a stainless mesh (150 mesh, JAS standard). At this time, the filtration time was measured from the start of filtration (measurement initiation), i.e. the time point of the beginning of the flow of the extraction liquid, to the stop, the time point when the extraction liquid disappears on the mesh (measurement completion), and evaluations were conducted with 4 steps (1 to 4) by the standards as described below.

1: Fast (10 seconds to 20 seconds)
2: Somewhat fast (21 seconds to 30 seconds)
3: Somewhat slow (31 seconds to 40 seconds)
4: Slow (41 seconds or more)

<Measurement of Extraction Rate>

10 g of each sample (raw tea leaves) was extracted with 1000 mL of 70° C. distilled water, and time which Brix reached to 0.3 was measured. At this time, Brix was measured with DD7 differential refractometer manufactured by ATAGO CO., LTD. Then, evaluations were conducted with 4 steps (1 to 4) by the standards as described below.

1: Very fast (90 seconds or less of the extraction rate)
2: Fast (91 to 120 seconds of the extraction rate)
3: Somewhat slow (121 to 150 seconds of the extraction rate)
4: Slow (151 seconds or more of the extraction rate)

<Evaluation of Beverage Obtained from Sample>

A beverage packed in a container was prepared from each of the samples (raw tea leaves), and the concentration feeling for the beverage immediately after the production of the beverage, was evaluated as described below.

(Preparation of Beverage Packed in Container)

10 g of each sample (raw tea leaves) was extracted with 1000 mL of 70° C. distilled water for 3.5 minutes, and the residue was removed with a mesh (150 mesh). The obtained extraction liquid was rapidly cooled to room temperature, and further subjected to centrifugation (7000 rpm, 10 minutes) to remove insoluble fractions, and then L-ascorbic acid was added in 300 ppm relative to the blend mass-up amount, and the mixture was adjusted to pH 6.0 with sodium bicarbonate, and the obtained blend liquid was subjected to UHT sterilization at 133 to 135° C. for 30 seconds, and then filled into a PET bottle and rapidly cooled to obtain a tea beverage packed in a container.

(Evaluation for Concentration Feeling of Beverage)

The beverage (5° C.) immediately after the production was drunk by the 5 panelists, and evaluations for the concentration feeling were performed.

=Evaluation for Concentration Feeling=
1: Very good
2: Good
3: Somewhat Inferior
4: Inferior (Total Evaluation)

The evaluations for the extraction rate, the filtration rate and the concentration feeling immediately after the production of the beverage were generalized and the samples were collectively evaluated.

=Standards for Total Evaluation=
⊚: Very excellent
○: Excellent
Δ: Somewhat Inferior
x: Inferior

TABLE 5

| | Product of Present Invention (Low-caffeine) | | | | | | | | |
|---|---|---|---|---|---|---|---|---|---|
| Sample No. | 1 | 3 | 4 | 5 | 6 | 7 | 11 | 12 | 14 |
| Method of Low-caffeine Treatment | Decocting | Decocting | Decocting | Decocting | Decocting | Decocting | Shower | Shower | Shower |
| Treatment temperature (° C.) | 85 | 90 | 95 | 90 | 95 | 95 | 90 | 95 | 80 |
| Treatment time (sec) | 30 | 90 | 30 | 15 | 30 | 90 | 60 | 45 | 15 |
| Caffeine (%) | 1.2 | 0.5 | 0.8 | 1.3 | 1.0 | 0.2 | 1.7 | 1.5 | 2.4 |
| Consolidation ratio | 0.9 | 0.85 | 0.88 | 0.9 | 0.89 | 0.05 | 0.87 | 0.89 | 0.87 |
| Evaluation Filtration rate | 1 | 2 | 1 | 1 | 1 | 2 | 1 | 1 | 2 |
| Extraction rate | 1 | 2 | 2 | 1 | 2 | 2 | 2 | 1 | 2 |
| Concentration feeling | 1 | 2 | 2 | 1 | 1 | 1 | 1 | 1 | 2 |
| Total Evaluation | ◎ | Δ | ○ | ◎ | ○ | Δ | ○ | ◎ | Δ |

TABLE 6

| | Comparative Product | | Comparative Product (Low-caffeine) | | |
|---|---|---|---|---|---|
| Sample No. | 17 | 18 | 20 | 22 | 24 |
| Method of Low-caffeine Treatment | — | — | Decocting | Decocting | Shower |
| Treatment temperature (° C.) | — | — | 85 | 95 | 80 |
| Treatment time (sec) | — | — | 60 | 45 | 120 |
| Caffeine (%) | 2.7 | 2.7 | 1.3 | 0.8 | 1.6 |
| Consolidation ratio | 0.81 | 0.82 | 0.79 | 0.79 | 0.79 |
| Evaluation Filtration rate | 3 | 3 | 2 | 3 | 2 |
| Extraction rate | 4 | 3 | 3 | 4 | 4 |
| Concentration feeling | 2 | 3 | 2 | 4 | 2 |
| Total Evaluation | x | x | x | x | x |

(Results/Discussion)

From comparison of FIGS. 4-5 and FIGS. 6-7, it was found out that any sample of the present invention product is shaped into a massive form in which plural tea leaves gather and which has a space in the inside, whereas any sample of the comparative product by the conventional manufacturing method, presents a rod-like form such as a needle by twisting one piece of tea leaf.

In addition, it is recognized that such form of the tea leaves has a consolidation ratio in a range of 0.85 to 0.95. Consequently, it is recognized that the consolidation ratio is one marker that represents the form of the present tea leaves for extraction.

From the results of Table 5 and Table 6, it was found out that the consolidation ratio of the present tea leaves for extraction is preferably in a range of 0.85 to 0.95. It was found out that when the consolidation ratio is in this range, the filtration rate and the extraction rate are fast, and further sediments hardly occur after storage from the production of the beverage, and the taste is not light even by low-caffeine treatment as seen from the evaluation for the concentration feeling. Accordingly, it was found out that raw tea leaves having the consolidation ratio in a range of 0.85 to 0.95 allows effective extraction of good delicious low-caffeine green tea for a short time.

From such viewpoint, it can be considered that the consolidation ratio of the present tea leaves for low-caffeine extraction is further preferably within a range of 0.88 to 0.93, and particularly preferably within a range of 0.89 to 0.91.

The invention claimed is:

1. A composition comprising:
   dry tea leaves for extraction of a green tea beverage,
   wherein a total content of caffeine relative to a total mass of the dry tea leaves is 0.2 to 2.5% by mass,
   wherein a relationship between a mass fraction X (%) of a total content of theanine relative to a total mass of the dry tea leaves, and a value Y of a total content of monosaccharides relative to a total amount of fiber in the dry tea leaves, satisfies the following condition:

$-0.007X+0.024 \leq Y \leq -0.011X+0.039$, and wherein a consolidation ratio of the tea leaves is 0.85 to 0.95.

2. The composition of claim 1, wherein the dry tea leaves are contained in a container.

3. The composition of claim 1, wherein the dry tea leaves are contained in a tea bag.

4. A composition comprising:
   an instant green tea powder comprising pulverized dry tea leaves,
   wherein a total content of caffeine relative to a total mass of the dry tea leaves is 0.2 to 2.5% by mass,
   wherein a relationship between a mass fraction X (%) of a total content of theanine relative to a total mass of the dry tea leaves, and a value Y of a total content of monosaccharides relative to a total amount of fiber in the dry tea leaves, satisfies the following condition:

$0.007X+0.024 \leq Y \leq -0.011X+0.039$, and wherein a consolidation ratio of the tea leaves is 0.85 to 0.95.

5. A composition comprising:
   a green tea beverage packed in a container, the green tea beverage comprising an extraction of dry green tea leaves,
   wherein a total content of caffeine relative to a total mass of the dry tea leaves is 0.2 to 2.5% by mass,
   wherein a relationship between a mass fraction X (%) of a total content of theanine relative to a total mass of the dry tea leaves, and a value Y of a total content of monosaccharides relative to a total amount of fiber in the dry tea leaves, satisfies the following condition:

$-0.007X+0.024 \leq Y \leq -0.011X+0.039$, and wherein a consolidation ratio of the tea leaves is 0.85 to 0.95.

6. The composition of claim 1, wherein the dry tea leaves are in a massive form.

7. The composition of claim 5, wherein the green tea beverage comprises an extraction produced by extracting dry green tea leaves in a massive form.

\* \* \* \* \*